A. W. PAYNE.
Whiffletree.

No. 96,610.  Patented Nov. 9, 1869.

Witnesses
J. Frank Medbery.
J. W. Medbery

Inventor
Lincoln & Willard
Attorneys
for
Anson W. Payne

United States Patent Office.

ANSON W. PAYNE, OF MAINE. NEW YORK.

Letters Patent No. 96,610, dated November 9, 1869.

IMPROVED WHIFFLETREE.

The Schedule referred to in these Letters Patent and making part of the same.

*To all whom it may concern:*

Be it known that I, ANSON W. PAYNE, of Maine, in the county of Broome, and State of New York, have invented a new and useful Improved Whiffletree; and I do hereby declare that the following is a full, clear, and exact description of the same, reference being had to the annexed drawings, making a part of this specification, in which—

Figure 1:
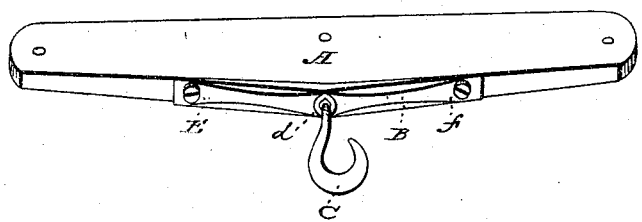
Figure 2:
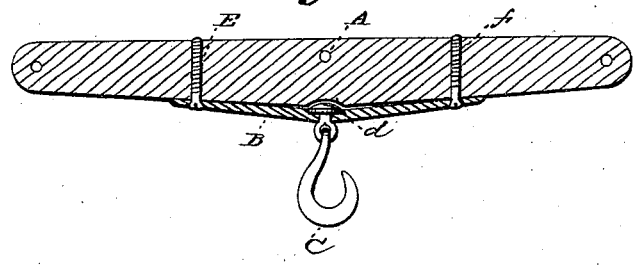

Figure 1 is a perspective view, and
Figure 2, a transverse section.

The hook and swivel are so attached to the whiffletree or evener as to be freely and easily worked up and down, sideways, or in any direction.

In fig. 1, A is the evener or whiffletree.

B is an iron plate, attached and secured to the whiffletree by means of bolts.

C is a hook, and d, a swivel, combined, the swivel d passing through the plate B, and headed securely on the inside of said plate.

In fig. 2, e and f are bolts, which secure the plate B to the evener or whiffletree A.

I do not claim the whiffletree, or plate, or the manner in which the plate is attached to the whiffletree.

Claim.

I claim, as my invention—

The combination of the hook C, swivel d, plate B, and whiffletree A, all constructed as herein set forth.

ANSON W. PAYNE.

Witnesses:
F. H. MAREAN,
N. P. BROWN.